(12) United States Patent
Mueller et al.

(10) Patent No.: US 11,719,149 B2
(45) Date of Patent: Aug. 8, 2023

(54) METHOD FOR OPERATING A SYSTEM WITH A PLURALITY OF METERING VALVES

(71) Applicant: Robert Bosch GmbH, Stuttgart (DE)

(72) Inventors: Johannes Georg Mueller, Ludwigsburg (DE); Roland Waschler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/625,950

(22) PCT Filed: Jul. 8, 2020

(86) PCT No.: PCT/EP2020/069302
§ 371 (c)(1),
(2) Date: Jan. 10, 2022

(87) PCT Pub. No.: WO2021/008978
PCT Pub. Date: Jan. 21, 2021

(65) Prior Publication Data
US 2022/0243629 A1 Aug. 4, 2022

(30) Foreign Application Priority Data
Jul. 12, 2019 (DE) ...................... 10 2019 210 361.8

(51) Int. Cl.
*F01N 3/20* (2006.01)
*F01N 3/035* (2006.01)
(Continued)

(52) U.S. Cl.
CPC ............ *F01N 3/208* (2013.01); *F01N 3/035* (2013.01); *F01N 3/106* (2013.01); *F01N 9/00* (2013.01);
(Continued)

(58) Field of Classification Search
CPC .......... F01N 3/208; F01N 3/035; F01N 3/106; F01N 9/00; F01N 11/00; F01N 2610/02;
(Continued)

(56) References Cited

U.S. PATENT DOCUMENTS

2010/0122527 A1\* 5/2010 Fukuda .................. B01D 46/42
60/303
2018/0028974 A1\* 2/2018 Lindahl ................. F01N 3/2066
(Continued)

FOREIGN PATENT DOCUMENTS

| DE | 112017002054 T5 | 12/2018 |
| DE | 102017215043 A1 | 2/2019 |
| DE | 102017223365 A1 | 6/2019 |

OTHER PUBLICATIONS

Translation of International Search Report for Application No. PCT/EP2020/069302 dated Aug. 21, 2020 (2 pages).

*Primary Examiner* — Brandon D Lee
(74) *Attorney, Agent, or Firm* — Michael Best & Friedrich LLP

(57) ABSTRACT

The invention proposes a method for operating a metering system (32) with a plurality of metering valves (34, 35) for an SCR catalyst system, in which opening times for the injection of reducing agent are calculated for the metering valves (34, 35) based on a metering amount requirement. In the calculations of the opening times, a metering-valve-specific adaptation factor is used, wherein a deviation ($\Delta p$) of a system pressure ($p_{ist}$) in the metering system (32) from a target pressure ($p_{soll}$) and a weighting factor are used for calculation of the metering-valve-specific adaptation factor. The weighting factor depends on a proportion ($r_{34}$, $r_{35}$) of the required metering amount ((formula (I)), (formula (II)) of the respective metering valve (34,35) in relation to a total metering amount ((formula (I)), (formula (II)) of all metering valves (34, 35).

15 Claims, 2 Drawing Sheets

(51) Int. Cl.
*F01N 3/10* (2006.01)
*F01N 9/00* (2006.01)
*F01N 11/00* (2006.01)

(52) U.S. Cl.
CPC .......... *F01N 11/00* (2013.01); *F01N 2610/02* (2013.01); *F01N 2610/146* (2013.01); *F01N 2900/0421* (2013.01); *F01N 2900/1808* (2013.01); *F01N 2900/1821* (2013.01); *F01N 2900/1822* (2013.01)

(58) Field of Classification Search
CPC ....... F01N 2610/146; F01N 2900/0421; F01N 2900/1808; F01N 2900/1821; F01N 2900/1822; F01N 2610/1453; F01N 2900/0408; F01N 3/2066
See application file for complete search history.

(56) References Cited

U.S. PATENT DOCUMENTS

| | | | |
|---|---|---|---|
| 2018/0135494 A1* | 5/2018 | David | F01N 3/2066 |
| 2018/0179936 A1* | 6/2018 | Matsumoto | F01N 3/2073 |
| 2020/0116060 A1* | 4/2020 | Suzuki | F01N 3/208 |

* cited by examiner

METHOD FOR OPERATING A SYSTEM WITH A PLURALITY OF METERING VALVES

BACKGROUND OF THE INVENTION

The present invention relates to a method for operating a metering system with multiple metering valves for an SCR catalytic converter system. Furthermore, the present invention relates to a computer program that performs each step of the method, as well as a machine-readable memory medium which stores the computer program. Finally, the invention relates to an electronic control unit which is set up to carry out the method.

Exhaust gas aftertreatment systems for reducing nitrogen oxide emissions use SCR catalytic converters, for example. selective catalytic reduction (selective catalytic reduction; SCR) of nitrogen oxides is carried out by a reducing agent solution, which is usually an aqueous urea solution (urea water solution; HWL), which is metered into the exhaust system to release ammonia. This reacts in the SCR catalytic converter with the nitrogen oxides present in the exhaust gas to form nitrogen and water. If multiple SCR catalytic converters are arranged one after the other in the exhaust system, it may be provided that a metering valve is arranged upstream of each SCR catalytic converter in order to meter the reducing agent solution into the exhaust system. All metering valves are connected to a common metering system, which is regulated to a target pressure of the reducing agent solution.

For this purpose, a closed pressure control loop is usually implemented, in which pressure deviations from the target pressure are corrected by means of a suitable pump controller, while for the realization of the requested metering quantity $m_{req}$, the metering valve is controlled in such a way that on the basis of the nominal valve characteristic $Q_{nom}(p)$ the control time ($t_i=m_{req}/Q_{nom}(p_{sys})$) of the valve follows from the value of this characteristic at the current system pressure $p_{sys}$. Since very often the system pressure sensor used for this purpose detects the system pressure $p_{sys}$ near the pump, one can also try to calculate the pressure at the metering point (the metering valve) for a higher quantitative accuracy by means of a model from knowledge of the system pressure $p_{sys}$ near the pump, $p_{inj}=f(p_{sys})$, and accordingly to take this into account in the calculation of the valve opening duration.

SUMMARY OF THE INVENTION

The method is used to operate a metering system with multiple metering valves for an SCR catalytic converter system. In particular, it is used to operate two metering valves of an SCR catalytic converter system with two SCR catalytic converters. In contrast to the prior art with a closed pressure control loop without pilot control, in the proposed method both the pump and the metering valves are operated purely pilot-controlled on the basis of the metering quantity requirement, in particular the latter on the basis of the target system pressure. In a purely nominal, i.e. tolerance-free, system, the target pressure is automatically set when the required metering quantity is implemented. If, on the other hand, the pump and valve actuators have production-related deviations from their nominal values, this results on the one hand in a stationary system pressure with a deviation $\Delta p$ from the target pressure and on the other hand in a metering quantity deviation from the target metering quantity, wherein the tolerance of the pump decisively determines the metering quantity deviation, and the tolerances of the metering valves are decisive for the resulting pressure deviation. In the proposed method, the knowledge of this pressure deviation is used to identify the deviation of the valves from their nominal value and then to compensate for them by adjusting the respective valve characteristics. It does not matter for the functional principle whether a pressure sensor or a pressure model is used to determine the system pressure and thus the system pressure deviation $\Delta p$.

This adaptation is preferably made by calculating an adaptation factor a for each metering valve. This then flows into the valve characteristic curve of the respective metering valve when calculating a respective opening time of each metering valve, i.e. the adapted valve characteristic $Q_{adap}$ results from a multiplication of the nominal characteristic curve $Q_{nom}$ by the respective adaptation factor a to give $Q_{adap}=a \cdot Q_{nom}$ and the control time $t_i$ of the valve results from the value of this adapted characteristic curve at the system target pressure $p_{soll}$ ($t_i=m_{req}/Q_{adap}(p_{soll})$). Since conventional metering strategies stipulate that the opening time of each metering valve is determined by means of a valve characteristic curve from its respective metering quantity requirement, this procedure makes it possible to trim the metering valves without having to make significant changes to their control software.

Each adaptation factor is preferably calculated with the help of a weighting factor. Each weighting factor depends on the proportion of the required metering quantity of the respective metering valve in the total metering quantity of all metering valves. It can be calculated using formula 1:

$$r_X = \frac{\overline{m}_x}{\sum_{n=1}^{y} \overline{m}_n} \quad \text{(Formula 1)}$$

Where $r_x$ refers to the weighting factor of the metering valve x, $\overline{m}_x$ refers to the requested metering quantity of the metering valve x, and y refers to the number of metering valves.

For all metering quantities used in formula 1, an average value of the metering quantity requirements for the respective metering valve made within a specifiable time interval before the current metering quantity requirement is preferably used. This is advantageous because a system pressure which may deviate from the target pressure is set over several individual dosages due to the system inertia and thus depends not only on the current dosage, but also on the dosages in a certain time interval before this.

The weighting factor can be calculated from the proportion of the respective metering valve by means of a function. In particular, the weighting factor may depend on the square of the respective proportion.

The calculation of each adaptation factor is preferably carried out by a PI controller. An individual PI controller is provided for each metering valve in order to enable individual metering valve adaptation of the metering quantities.

The integrators of all PI controllers are preferably not time-based, but event-based. This makes it possible to carry out integration for each pump stroke of a feed pump of the metering valve.

Furthermore, it is preferred that the adaptation takes place only if the deviation of the system pressure from the target pressure is outside a predetermined range. Thus, no attempt is made to adapt the metering quantities of a metering system with the system pressure close to a target pressure.

This could lead to a deterioration in metering behavior under unfavorable circumstances, such as inaccurate detection of system pressure.

The computer program is set up to carry out every step of the method, in particular if it runs on a computing device or on an electronic control unit. It enables the implementation of different embodiments of the method on an electronic control unit without having to make structural changes to it. For this purpose, it is stored on the machine-readable memory medium. By installing the computer program on a conventional electronic control unit, an electrical control unit is obtained which is set up to operate multiple metering valves of a metering system by means of the method.

BRIEF DESCRIPTION OF THE DRAWINGS

Exemplary embodiments of the invention are presented in the drawings and are explained in more detail in the following description.

DETAILED DESCRIPTION

Figure 1:
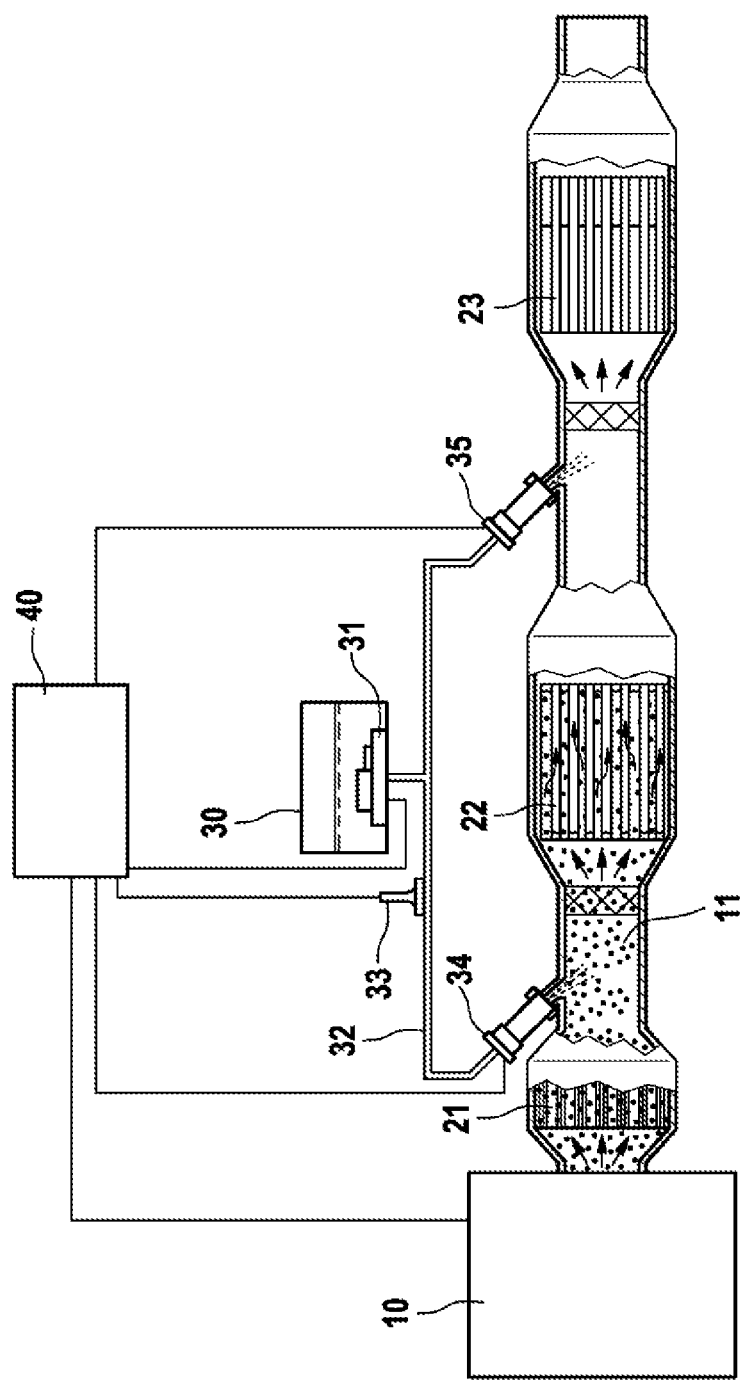
FIG. 1 shows schematically elements of an SCR catalytic converter system, the metering valves of which can be operated by means of exemplary embodiments of the method according to the invention.

A combustion engine 10, which is shown in FIG. 1, has an exhaust system 11. In the exhaust system 11 an NSC catalytic converter 21, a first SCR catalytic converter 22, which is arranged on a diesel particulate filter, and a second SCR catalytic converter 23 combined with a CUC catalytic converter (clean up catalytic converter), are arranged successively. A HWL is stored in a reducing agent tank 30, on the bottom of which a conveyor module 31 is arranged. This is transported by a feed pump in the delivery module 31 into a metering system 32, which consists of a branched pipe system. A pressure sensor 33 measures the system pressure in the metering system 32. A first metering valve 34 and a second metering valve 35 are arranged at two ends of the piping system of the metering system 32. The first metering valve 34 is located in the exhaust system 11 upstream of the first SCR catalytic converter. The second metering valve 35 is located in the exhaust system 11 upstream of the second SCR catalytic converter 23. By means of both metering valves 34, 35, HWL is metered into the exhaust system 11, from which ammonia is released there. This reacts in the SCR catalytic converters 22, 23 in a selective catalytic reaction with nitrogen oxide emissions of the combustion engine 10 to give nitrogen and water. An electronic control unit 40 controls the combustion engine 10, the conveying module 31 and the two metering valves 34, 35. It receives measurement data from the pressure sensor 33.

Figure 2:
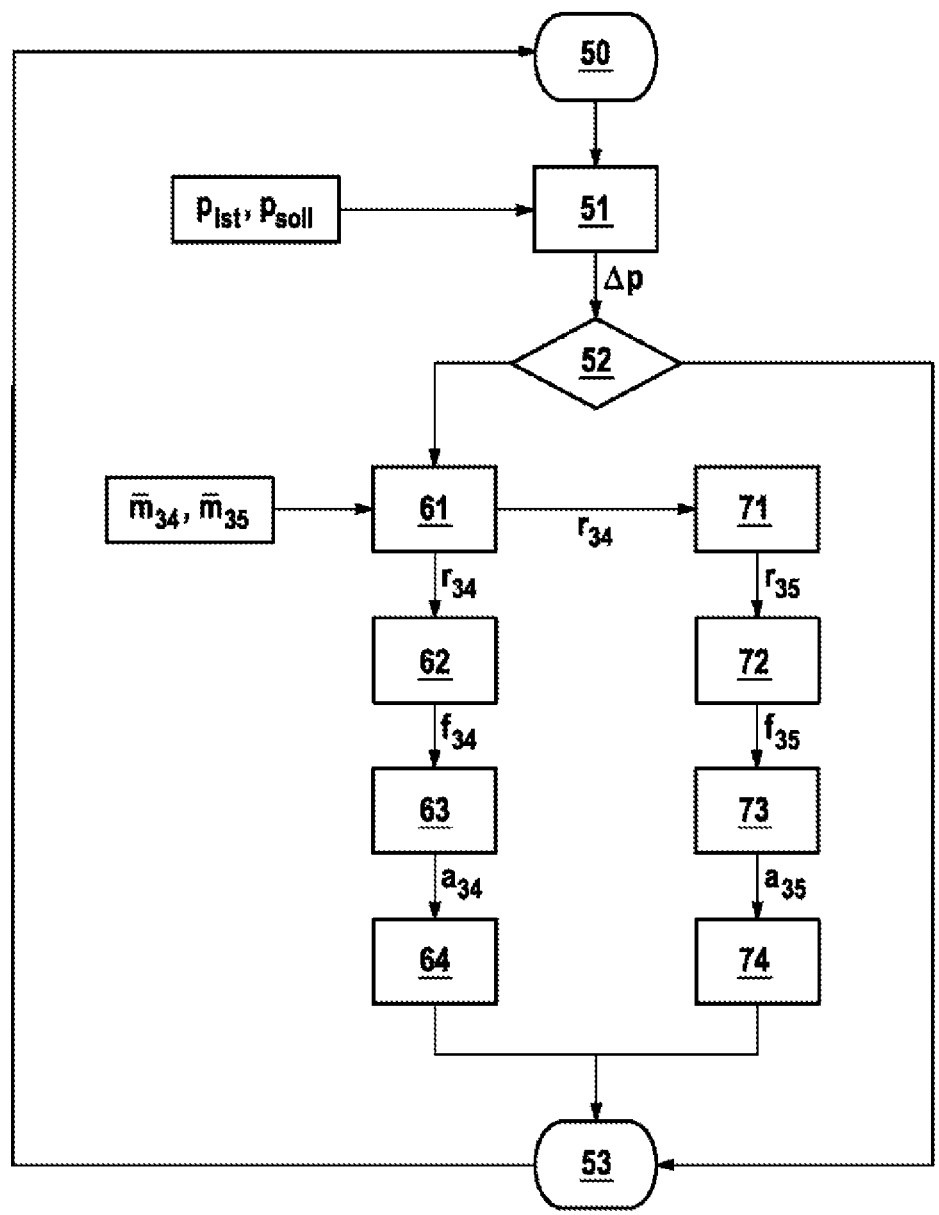
FIG. 2 shows a flow diagram of an exemplary embodiment of the method according to the invention.

As shown in FIG. 2, a start 50 of an exemplary embodiment of the method according to the invention is carried out when metering quantity requirements for the two metering valves 34, 35 are issued. Subsequently, a difference 51 formed between the system pressure $p_{ist}$ determined by means of the pressure sensor 33 or pressure model and a target pressure $p_{soll}$ is 6 bar in the present case, for example. Subsequently, a test 52 is carried out as to whether the deviation Δp between the system pressure $p_{ist}$ and the target pressure $p_{soll}$ obtained by this difference formation is outside a specified tolerance range. If this is not the case, no further adaptation takes place in the current system state and the HWL doses are reduced by the last calculated adaptation factors. Otherwise, a calculation 61 of a proportion $r_{34}$ of the requested metering quantity of the metering valve 34 of the total metering quantity of the two metering valves 34, 35 is first calculated. For this purpose, past average values $\overline{m}_{34}$, $\overline{m}_{35}$ of the metering quantity requirements for the two metering valves 34, 35 are provided and the proportion $r_{34}$ is calculated using formula 2:

$$r_{34} = \frac{\overline{m}_{34}}{\overline{m}_{34} + \overline{m}_{35}} \qquad \text{(Formula 2)}$$

By a forming a square 62 according to formula 3, a weighting factor $f_{34}$ is calculated for the first metering valve 34:

$$f_{34} = r_{34}^2 \qquad \text{(Formula 3)}$$

This weighting factor $f_{34}$ is now, after multiplication by the current or suitably filtered pressure deviation Δp, fed to an event-based PI controller of the first metering valve 34 to perform a calculation 63 of an adaptation factor $a_{34}$ of the first metering valve 34. This adaptation factor $a_{34}$ is fed 64 to a valve characteristic of the first metering valve 34.

The calculation of a proportion $r_{35}$ of the requested metering quantity of the second metering valve 35 of a total metering quantity could in principle be carried out according to formula 4 similarly to the procedure according to formula 2:

$$r_{35} = \frac{\overline{m}_{35}}{\overline{m}_{34} + \overline{m}_{35}} \qquad \text{(Formula 4)}$$

However, since the proportion $r_{34}$ of the first metering valve 34 has already been calculated, this value is used to save computing time in the electronic control unit 40 in order to calculate 71 the proportion $r_{35}$ of the second metering valve 35 as the difference of the proportion $r_{34}$ of the first metering valve 34 from one according to formula 5:

$$r_{35} = 1 - r_{34} \qquad \text{(Formula 5)}$$

From this proportion $r_{35}$ the weighting factor of the second metering valve 35 is calculated in a further calculation 72 according to formula 6 similarly to the procedure according to formula 3:

$$f_{35} = r_{35}^2 \qquad \text{(Formula 6)}$$

The weighting factor $f_{35}$ of the second metering valve 35 is fed similarly to the procedure for the first valve to an event-based PI controller of the second metering valve 35 in order to obtain an adaptation factor $a_{35}$ of the second metering valve 35. This adaptation factor $a_{35}$ of the second metering valve 35 is fed to a valve characteristic of the second metering valve 35.

This method is carried out continuously, i.e. as soon as the current system pressure deviation exceeds an arbitrarily applicable threshold, new values of the adaptation factors $a_{34}$ and $a_{35}$ are calculated. If the valve opening times are now determined from the requested metering quantities and the respective adapted valve characteristics in order to reduce the metering quantities by means of the metering valves 34, 35, the adaptation factors $a_{34}$, $a_{35}$ cause an adaptation of the valve opening times and thus also of the reduced metering quantities, so that the system pressure $p_{ist}$ can be adjusted towards the target pressure $p_{soll}$ again.

In a further embodiment of the method, there is also the possibility, in addition to the adaptation of the valve characteristics, to adapt the stored conveying characteristic of the pump, in that by the calculation of the valve adaptation factors, an adaptation factor for the stored flow volume of the pump is additionally calculated by means of a PI controller with the pressure deviation $\Delta p$ as input. This is particularly suitable in the context of a special implementation of the method in the event that when operating the system with multiple valves, the resulting valve adaptation factors all assume very similar values with a significant deviation from the nominal value (for example $a_{34} \approx a_{35} > 1.15$ or $a_{34} \approx a_{35} < 0.85$). Such behavior of the system suggests that the essential tolerance influence of the system is a deviation of the feed pump from its nominal value. In this case, the valve adaptation factors are each set to 1.0 and instead an adaptation factor for the stored flow volume of the pump is calculated by means of a PI controller with the pressure deviation $\Delta p$ as input, comparable to the described method with application to the two valves, but without using a weighting factor.

The invention claimed is:

1. A method for operating a metering system (32) with multiple metering valves (34, 35) for an SCR catalytic converter system in which opening times for the injection of reducing agents are calculated for the metering valves (34, 35) on the basis of a metering quantity requirement, the method comprising:
    calculating the respective opening time of each of the metering valves (34, 35) based on a respective metering valve-individual adaptation factor ($a_{34}$, $a_{35}$),
    calculating the metering valve-individual adaptation factor for each of the metering valves (34, 35) when a pressure deviation ($\Delta p$) of a system pressure ($p_{ist}$) in the metering system (32) from a nominal pressure ($p_{soll}$) is outside a given range by using a weighting factor, the weighting factor being based on a proportion ($r_{34}$, $r_{35}$) of the required metering quantity ($\overline{m}_{34}$, $\overline{m}_{35}$) of the respective metering valve (34, 35) of a total metering quantity ($\overline{m}_{34} + \overline{m}_{35}$) of all the metering valves (34, 35), and
    operating a pump and operating the metering valves (34, 35) of the metering system (32) at the respective opening times to provide the reducing agents to the SCR catalytic converter system.

2. The method as claimed in claim 1, wherein the method includes continuously calculating (63, 73) the respective metering valve-individual adaptation factor ($a_{34}$, $a_{35}$) for each of the metering valves (34, 35).

3. The method as claimed in claim 1, wherein the weighting factor is based on an average of the requested metering quantity ($\overline{m}_{34}$, $\overline{m}_{35}$) of the respective metering valve (34, 35) applied against a total metering quantity ($\overline{m}_{34} + \overline{m}_{35}$) of all metering valves (34, 35) of a specified time interval before a current metering quantity requirement.

4. The method as claimed in claim 1, wherein the weighting factor (b, b) is based on a square of the respective proportion ($r_{34}$, $r_{35}$) of the required metering quantity ($\overline{m}_{34}$, $\overline{m}_{35}$) of the respective metering valve (34, 35) of the total metering quantity ($\overline{m}_{34} + \overline{m}_{35}$) of all the metering valves (34, 35).

5. The method as claimed in claim 1, wherein each metering valve-individual adaptation factor ($a_{34}$, $a_{35}$) is calculated by an individual PI controller provided for each of the metering valves (34, 35).

6. The method as claimed in claim 5, wherein all integrators of the PI controllers are event-based.

7. The method as claimed in claim 1, further comprising calculating an adaptation factor for the stored flow volume of the pump by means of a further PI controller and based on the deviation ($\Delta p$).

8. The method as claimed in claim 1, further comprising setting the adaptation factors to 1.0.

9. A non-transitory, computer-readable medium containing instructions that when executed by a computer cause the computer to operate a metering system (32) with multiple metering valves (34, 35) for an SCR catalytic converter system in which opening times for the injection of reducing agents are calculated for the metering valves (34, 35) on the basis of a metering quantity requirement, by
    calculating the respective opening time of each of the metering valves (34, 35) based on a respective metering valve-individual adaptation factor ($a_{34}$, $a_{35}$),
    calculating the metering valve-individual adaptation factor for each of the metering valves (34, 35) when a pressure deviation ($\Delta p$) of a system pressure ($p_{ist}$) in the metering system (32) from a nominal pressure ($p_{soll}$) is outside a given range by using a weighting factor, the weighting factor being based on a proportion ($r_{34}$, $r_{35}$) of the required metering quantity ($\overline{m}_{34}$, $\overline{m}_{35}$) of the respective metering valve (34, 35) of a total metering quantity ($\overline{m}_{34} + \overline{m}_{35}$) of all the metering valves (34, 35), and
    operating a pump and operating the metering valves (34, 35) of the metering system (32) at the respective opening times to provide the reducing agents to the SCR catalytic converter system.

10. The non-transitory, computer-readable medium as claimed in claim 9, wherein the weighting factor is based on an average of the requested metering quantity ($\overline{m}_{34}$, $\overline{m}_{35}$) of the respective metering valve (34, 35) applied against a total metering quantity ($\overline{m}_{34} + \overline{m}_{35}$) of all metering valves (34, 35) of a specified time interval before a current metering quantity requirement.

11. The non-transitory, computer-readable medium as claimed in claim 9, wherein the weighting factor (b, b) is based on a square of the respective proportion ($r_{34}$, $r_{35}$) of the required metering quantity ($\overline{m}_{34}$, $\overline{m}_{35}$) of the respective metering valve (34, 35) of the total metering quantity ($\overline{m}_{34} + \overline{m}_{35}$) of all the metering valves (34, 35).

12. An electronic control unit (40) configured to operate a metering system (32) with multiple metering valves (34, 35) for an SCR catalytic converter system in which opening times for the injection of reducing agents are calculated for the metering valves (34, 35) on the basis of a metering quantity requirement, by:
    calculating the respective opening time of each of the metering valves (34, 35) based on a respective metering valve-individual adaptation factor ($a_{34}$, $a_{35}$),
    calculating the metering valve-individual adaptation factor for each of the metering valves (34, 35) when a pressure deviation ($\Delta p$) of a system pressure ($p_{ist}$) in the metering system (32) from a nominal pressure ($p_{soll}$) is outside a given range by using a weighting factor, wherein the weighting factor is based on a proportion ($r_{34}$, $r_{35}$) of the required metering quantity ($\overline{m}_{34}$, $\overline{m}_{35}$) of the respective metering valve (34, 35) of a total metering quantity ($\overline{m}_{34} + \overline{m}_{35}$) of all the metering valves (34, 35), and
    operating a pump and operating the metering valves (34, 35) at the respective opening times to provide the reducing agents to the SCR catalytic converter system.

13. The electronic control unit (40) as claimed in claim 12, wherein the weighting factor is based on an average of the requested metering quantity ($\overline{m}_{34}$, $\overline{m}_{35}$) of the respective metering valve (34, 35) applied against a total metering quantity ($\overline{m}_{34}+\overline{m}_{35}$) of all metering valves (34, 35) of a specified time interval before a current metering quantity requirement.

14. The electronic control unit (40) as claimed in claim 12, wherein the weighting factor (b, b) is based on a square of the respective proportion ($r_{34}$, $r_{35}$) of the required metering quantity ($\overline{m}_{34}$, $\overline{m}_{35}$) of the respective metering valve (34, 35) of the total metering quantity ($\overline{m}_{34}+\overline{m}_{35}$) of all the metering valves (34, 35).

15. The electronic control unit (40) as claimed in claim 12, wherein each metering valve-individual adaptation factor ($a_{34}$, $a_{35}$) is calculated by an individual a PI controller provided for each of the metering valves (34, 35).

* * * * *